US010789060B2

(12) United States Patent
Moore

(10) Patent No.: US 10,789,060 B2
(45) Date of Patent: Sep. 29, 2020

(54) PROVIDING AND USING DIFFERENT UPDATE TIMES FOR A RESOURCE

(71) Applicant: Comcast Cable Communications, LLC, Philadelphia, PA (US)

(72) Inventor: Jonathan Moore, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 299 days.

(21) Appl. No.: 15/699,143

(22) Filed: Sep. 8, 2017

(65) Prior Publication Data

US 2018/0217832 A1 Aug. 2, 2018

Related U.S. Application Data

(63) Continuation of application No. 14/824,569, filed on Aug. 12, 2015, now Pat. No. 9,792,108.

(51) Int. Cl.
| | |
|---|---|
| *G06F 8/65* | (2018.01) |
| *H04L 29/08* | (2006.01) |
| *H04L 12/24* | (2006.01) |
| *H04L 12/26* | (2006.01) |

(52) U.S. Cl.
CPC .............. *G06F 8/65* (2013.01); *H04L 41/082* (2013.01); *H04L 67/02* (2013.01); *H04L 67/1095* (2013.01); *H04L 67/34* (2013.01); *H04L 41/5083* (2013.01); *H04L 43/18* (2013.01)

(58) Field of Classification Search
CPC . G06F 8/65; H04L 41/02; H04L 67/02; H04L 67/1095; H04L 67/34; H04L 41/5083; H04L 43/18
See application file for complete search history.

(56) References Cited

U.S. PATENT DOCUMENTS

| | | | | |
|---|---|---|---|---|
| 4,714,996 | A  * | 12/1987 | Gladney | ................ G06F 16/27 |
| 6,278,965 | B1 | 8/2001 | Glass et al. | |
| 6,581,075 | B1 * | 6/2003 | Guturu | ................. G06F 16/273 |
| 6,618,751 | B1 * | 9/2003 | Challenger | ........... H04L 67/325 |
| | | | | 709/203 |
| 6,636,891 | B1 | 10/2003 | LeClair et al. | |
| 7,099,914 | B1 | 8/2006 | Hartmann et al. | |
| 7,685,577 | B2 * | 3/2010 | Pace | ........................ G06F 8/60 |
| | | | | 717/103 |
| 7,761,500 | B1 | 7/2010 | Eckert et al. | |
| 8,104,077 | B1 | 1/2012 | Gauvin et al. | |
| 2004/0230624 | A1 * | 11/2004 | Frolund | .............. G06F 11/1662 |
| 2006/0036743 | A1 | 2/2006 | Deng et al. | |
| 2006/0168574 | A1 | 7/2006 | Giannini et al. | |

(Continued)

OTHER PUBLICATIONS

Fielding et al., "RFC 2616", https://www.ietf.org/rfc/rfc2616.txt, 1999.

*Primary Examiner* — Viva Miller
(74) *Attorney, Agent, or Firm* — Banner & Witcoff, Ltd.

(57) ABSTRACT

Methods, systems, computer-readable media, and apparatuses are described for sending different update times corresponding to a same version of a resource. A computing device may provide a version of a resource in response to requests from a plurality of different devices, and may indicate different update times for the version of the resource. The different update times may be based on times associated with the requests from the plurality of different devices.

24 Claims, 4 Drawing Sheets

(56) References Cited

U.S. PATENT DOCUMENTS

| | | | |
|---|---|---|---|
| 2007/0168516 A1 | 7/2007 | Liu et al. | |
| 2007/0192462 A1* | 8/2007 | Bae | H04L 12/2809 709/223 |
| 2007/0288524 A1* | 12/2007 | Luick | H04L 67/1095 |
| 2008/0034294 A1 | 2/2008 | Ronkainen et al. | |
| 2008/0147744 A1 | 6/2008 | Barmettler et al. | |
| 2010/0211682 A1* | 8/2010 | Capomassi | G06F 16/2322 709/226 |
| 2011/0066676 A1 | 3/2011 | Kleyzit et al. | |
| 2011/0125765 A1* | 5/2011 | Tuli | G06F 16/4387 707/751 |
| 2011/0208808 A1 | 8/2011 | Corbett | |
| 2012/0246292 A1* | 9/2012 | Weber | H04L 29/08648 709/224 |
| 2015/0040114 A1* | 2/2015 | Miyama | G06F 16/27 717/170 |
| 2015/0309784 A1* | 10/2015 | Molin | G06F 8/65 701/71 |
| 2016/0162280 A1* | 6/2016 | Murayama | G06F 8/65 717/170 |
| 2017/0235808 A1* | 8/2017 | Salame | H04L 67/1095 707/625 |

\* cited by examiner

PROVIDING AND USING DIFFERENT UPDATE TIMES FOR A RESOURCE

This application is a continuation of U.S. patent application Ser. No. 14/824,569, filed Aug. 12, 2015, entitled "Scheme for Managing Last-Modified Information", the disclosures of which are hereby incorporated by reference.

BACKGROUND

Under hypertext transfer protocol (HTTP) specifications, when a server receives a request associated with a resource, the server may provide a Last-Modified header to the client device. The Last-Modified header may include an update time of the resource having a maximum granularity of whole seconds. For example, the update time may be 2 seconds or 3 seconds but may not be 2.5 seconds since sub-seconds is beyond the maximum granularity of the Last-Modified header. As a result, when a resource stored at a server is updated more than once within the same second, for each update after the first update in that second, the server may not accurately respond to validation requests from the client device when the validation requests include an update time of the first update. For example, the server may inaccurately indicate that the client device has an up-to-date copy of the resource when, in actuality, the client device does not have an up-to-date copy of the resource. Accordingly, the client device may never receive updates to a resource that occur after a first update to the resource that occurs within the same second.

There will be an ever-present need for improved techniques for ensuring the validity and currency of resources and accurately responding to requests from a client device for the resources.

SUMMARY

Various aspects of the disclosure provide more efficient, effective, functional, and convenient ways of providing a scheme for managing HTTP Last-Modified headers.

In some embodiments, a computing device may receive a request to identify the last time a resource was updated, and when reporting that update time, the computing device may determine whether to round up or down that update time of the resource based on when the request was received.

In some embodiments, a computing device may receive, from a client device, a first validation request for a resource and a second validation request for the resource. In response to determining that the first validation request was received within a window, the computing device may determine whether to round down an update time of the resource. In response to determining that the second validation request was received outside of the window, the computing device may determine whether to round up the update time of the resource.

In some embodiments, a computing device may determine whether to round up a reported update time of a resource or determine if a timestamp of a validation request is less than or equal to the update time respectively based on whether the validation request from a client device for the resource is received within a window. The timestamp may be associated with the resource.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various example embodiments, reference is made to the accompanying drawings identified above, which form a part hereof, and in which is shown by way of illustration various embodiments in which aspects of the disclosure may be practiced. Other embodiments may be utilized and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
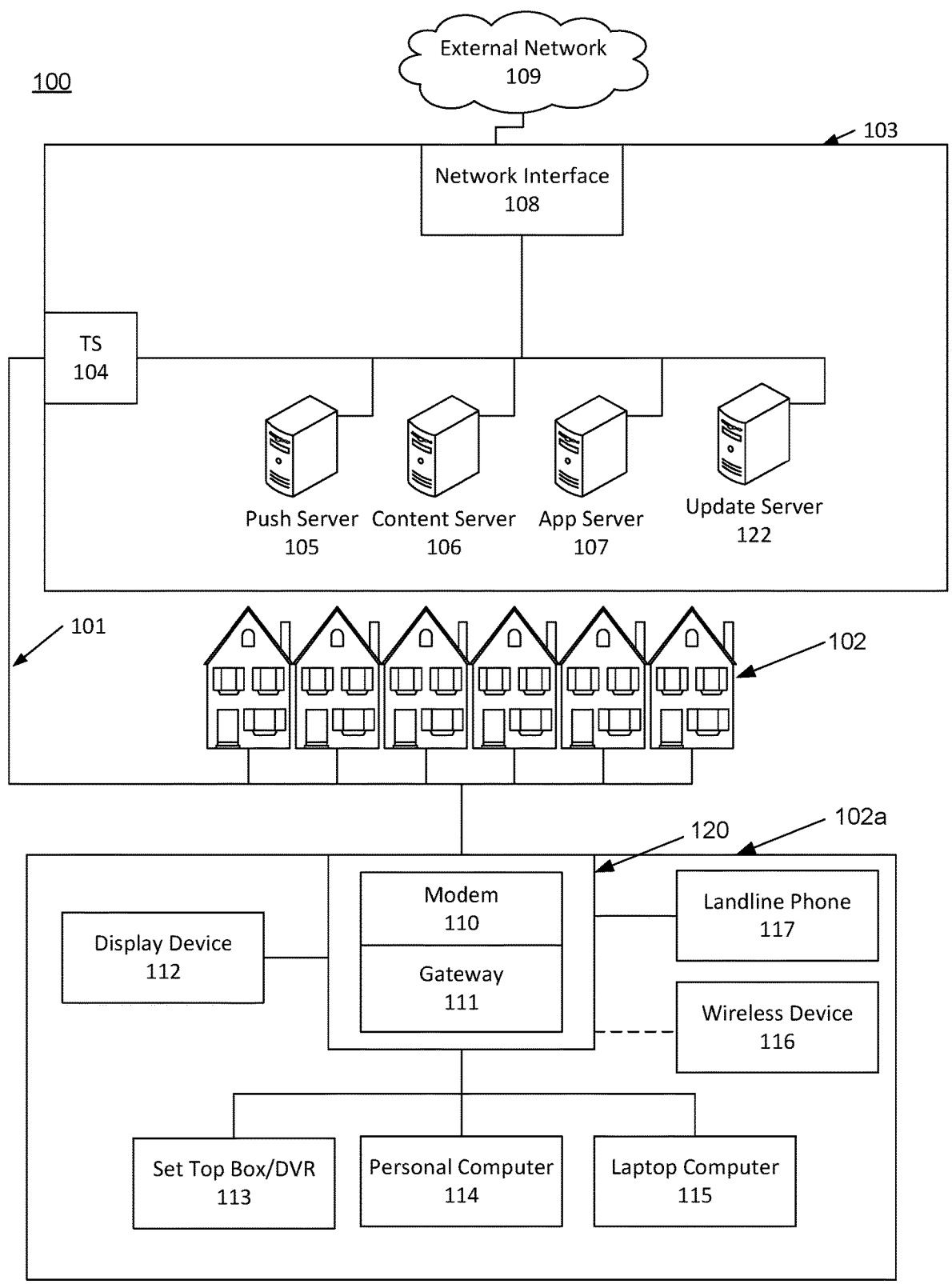
FIG. 1 depicts an example communication network on which various features described herein may be used.

FIG. 1 illustrates an example communication network 100 on which many of the various features described herein may be implemented. The communication network 100 may be any type of information distribution network, such as satellite, telephone, cellular, wireless, etc. One example may be an optical fiber network, a coaxial cable network, or a hybrid fiber/coax distribution network. The communication network 100 may use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS). More specifically, the interface 104 may be a cable modem termination system (CMTS), which may be a computing device configured to manage communications between devices on the network of the links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. An application server may be responsible for monitoring user viewing habits and collecting that information for use in selecting advertisements. An application server may be responsible for formatting and inserting advertisements in a video stream being transmitted to the premises 102. Although shown separately, one of ordinary skill in the art will appreciate that the push server 105, the content server 106, and the application server 107 may be combined. Further, here the push server 105, the content server 106, and the application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines), a fiber interface node (for fiber optic lines), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may be a set-top box (STB), digital video recorder (DVR), a digital transport adapter (DTA), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

The local office 103 may include an update server 122. Although shown separately, the update server 122 may be combined with one or more of the push server 105, the content server 106, and the application server 107. In one or more examples discussed herein, the update server 122 may be a web server configured in accordance with HTTP 1.0 and/or 1.1 specifications to store, and make available to requesting clients, a copy of a resource. The resource may be a webpage, a data file, a software application, a cascading style sheet (CSS) for a webpage, a Javascript file for a webpage, or any other data. The resource may be periodically updated (e.g., a new version of an Internet page may be uploaded by a news organization). In some instances, the webpage may be updated many times per second. For example, the update server 122 may update a Wall Street stock quote website many times per second. The update server 122 may store information identifying the time at which the resource was updated. This time information may be very precise, and may have granularity down to fractions of a second (e.g., to the tenths of a second, hundreds of a second, thousandths, etc.). For example, the update server 122 may store information indicating that a particular resource was last updated on Monday, Aug. 16, 2014, at 12:45:26.81 PM EST. As noted above, the update server 122 may service requests for the resource. For example, the update server 122 may receive requests from a client device for a resource stored at the update server 122. For example, the request may be a read request (e.g., a get request) and/or any other unconditional request requesting the web controller 122 to send a copy of the resource to the client device. In response to a receiving read request from a client, the update server 122 may send, with the copy of the resource, a field (e.g., a Last-Modified header) indicating the latest time at which the resource was updated at the update server 122. Under HTTP 1.0 and 1.1 specifications, the Last-Modified header may include the date and time of the update including, for example, the day of the week, month, day, hour, minutes, seconds, and time zone. For example, a Last-Modified header may indicate that the update occurred on Monday, 16 Aug. 2014 12:45:26 EST (e.g., eastern standard time). However, under HTTP 1.0 or 1.1 specifications, the Last-Modified header may have a maximum granularity of whole seconds. Consequently, the seconds field of the Last-Modified header may have a value of 26 seconds rather than 26.81 seconds as shown above. In response to receiving the resource and the Last-Modified header, the client device may use the resource in rendering a webpage. Additionally, the client may store the resource in its cache for later use in rendering a webpage at a later time. The client may also store the time value of the Last-Modified header for later use with validation requests.

At a later time, a client may wish to render a webpage that includes the resource stored in its cache. The webpage may be the same webpage previously rendered by the client or may be a different webpage. However, prior to rendering the webpage, the client may wish to validate with a server whether the current copy of the resource stored in its cache is up-to-date (e.g., that the cached copy of the resource includes all updates of the resource) by generating and sending a validation request to the update server 122. The validation request is a conditional request that requests the update server 122 to send a copy of the resource to the client device only if a current copy of the resource cached at the client device is out-of-date and/or not the most recent updated copy of the resource. The validation request may include an If-Modified-Since header field that may include the update time of a resource when the client device previously retrieved the resource from the update server 122 (e.g., the time included in the received Last-Modified header). For example, the If-Modified-Since header may indicate the latest update time of the copy of the resource stored in the client's cache, which is the stored time value included in the latest Last-Modified header for the resource received by the client.

A conventional server may, using the latest update time of the If-Modified-Since header, determine whether the client's cached copy of the resource is up-to-date. In response to determining that the client's cached copy of the resource is up-to-date, the update server 122 may send to the client a message indicating that the client's cached resource is update-to-date (e.g., a 304 Response). In response to determining that the client's cached copy of the resource is not up-to-date, the update server 122 may send an updated copy of the resource with a corresponding Last-Modified header (e.g., a 200 Response). However, because the Last-Modified header may have a maximum granularity of whole seconds, the If-Modified-Since header sent from the client would also have a maximum granularity of whole seconds. Following the above example, the If-Modified-Since header may indicate that the update for the client's cached resource occurred on Monday, 16 Aug. 2014 12:45:26 EST rather than the actual update time of Monday, 16 Aug. 2014 12:45:26.86 EST. In such a situation, if the server happens to update the resource twice in the same second (e.g., updated again at 26.95 seconds), and the client only has the first update (e.g., the one at the 26.81-second mark), the server may erroneously determine, based on the received information indicating that the last update occurred at the 26-second mark, that the client's cached copy of the resource is up-to-date. As a result, the server would erroneously send, to the client, a 304 Response indicating that the client's cached resource is up-to-date. The client would then erroneously think that its cached copy of the resource is up-to-date and would then render a webpage with the outdated cached copy of the resource. As will be described below, features described herein may change the way in which the last update information is determined.

Figure 2:
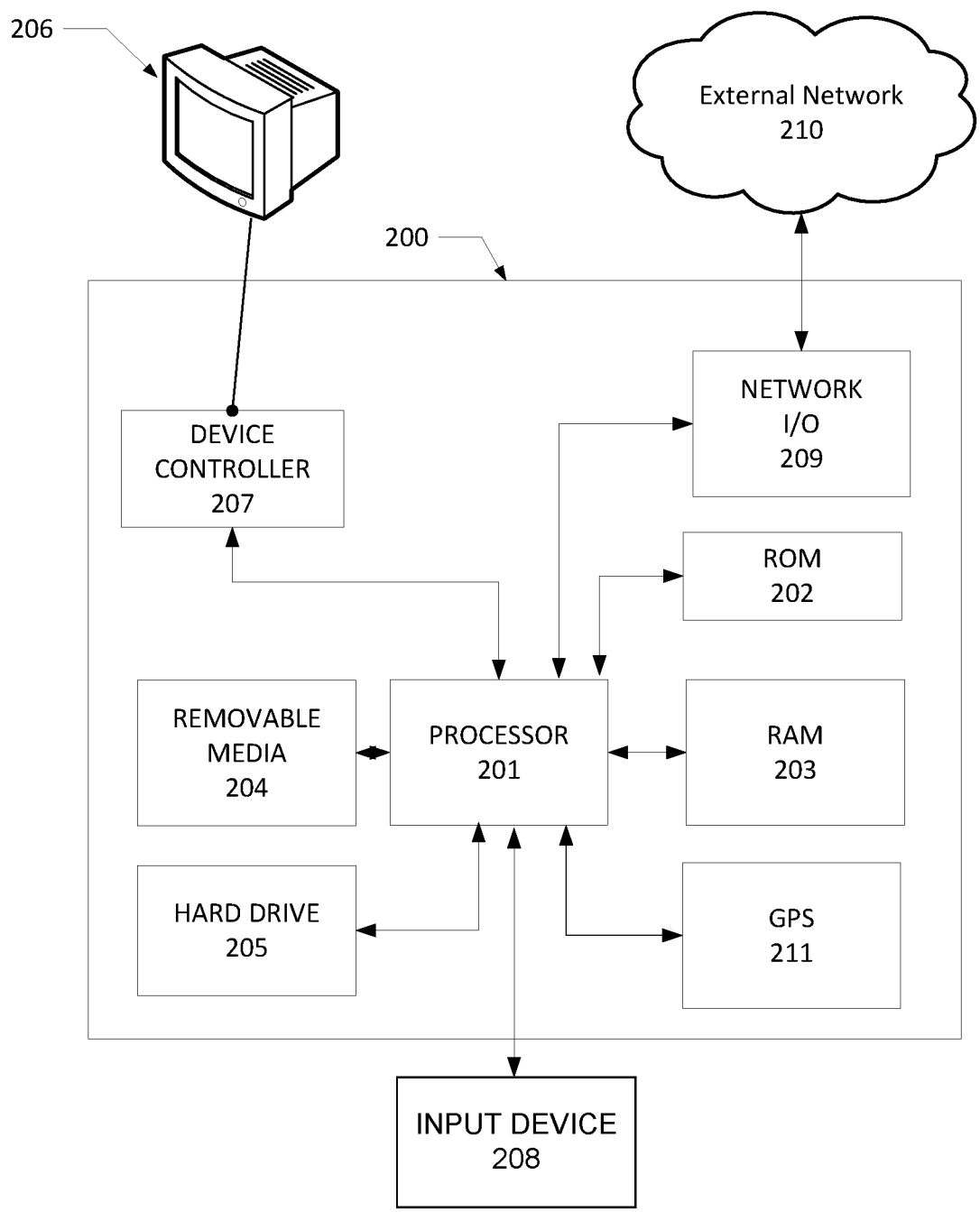
FIG. 2 depicts an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
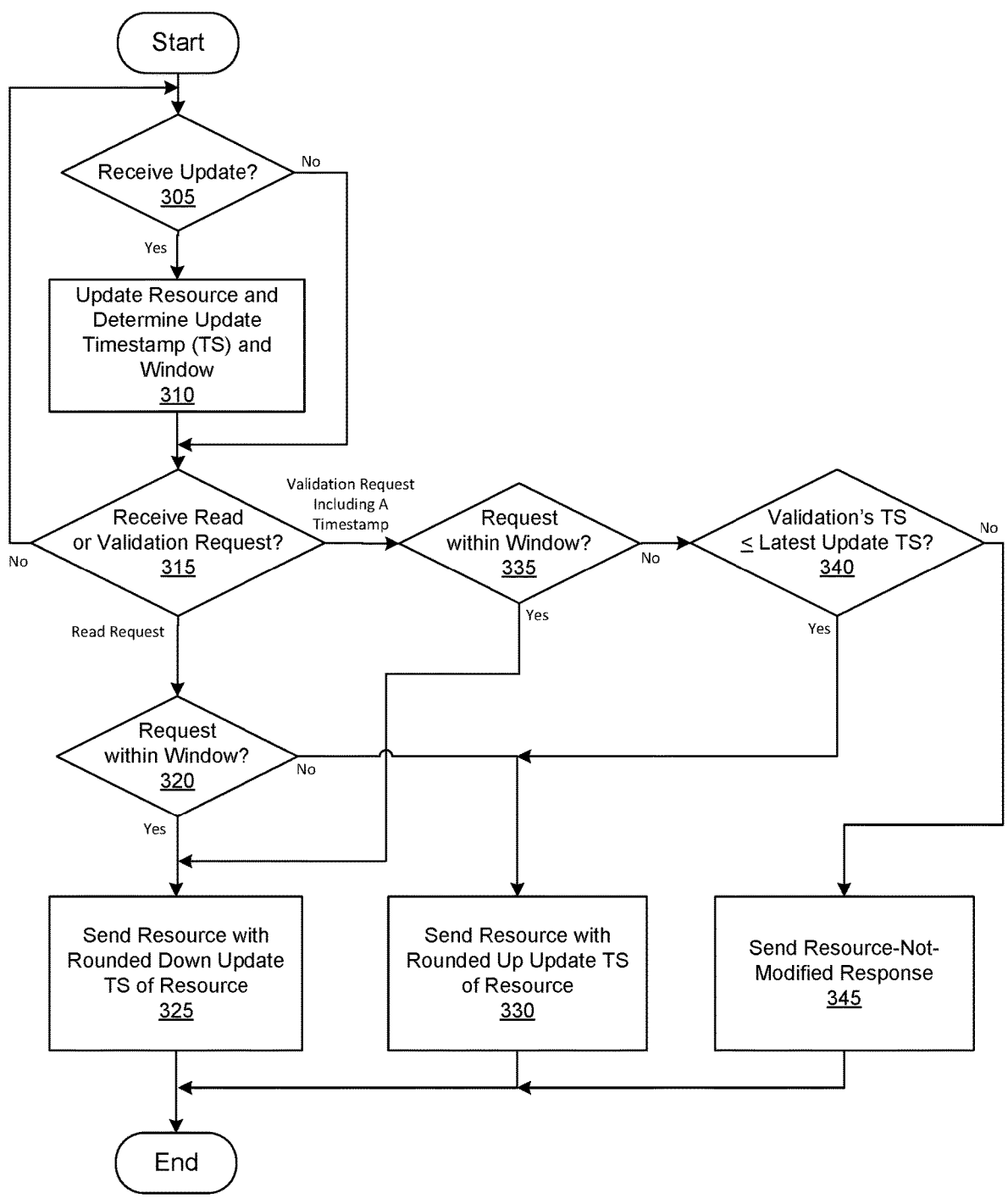
FIG. 3 depicts a flowchart of an example method of managing update times of a resource for responding to requests associated with the resource in accordance with one or more example aspects discussed herein.

FIG. 3 depicts a flowchart of an example method of managing update times of a resource for responding to requests associated with the resource in accordance with one or more example aspects discussed herein. In one or more embodiments, the method of FIG. 3 and/or one or more steps thereof may be performed by a computing device (e.g., computing device 200, implementing update server 122). In other embodiments, the method illustrated in FIG. 3 and/or one or more steps thereof may be embodied in computer-executable instructions that are stored in a computer-readable medium, such as a non-transitory computer-readable memory.

As seen in FIG. 3, the method may begin at step 305 in which the update server 122 may determine whether the update server 122 has received an update for a resource. For example, in step 305, the update server 122 may receive the update from another computing device (e.g., another device of the headend 103). In response to a determination that an update has been received, the method may proceed to step 310. In response to a determination that an update has not been received, the method may proceed to step 315.

In step 310, the update server 122 may update and store the resource, and may determine an update timestamp (indicating the time of the update) and a time window (a time range that is based on the update timestamp, and which will be used, as described further below, when deciding how to round the update timestamp when reporting it to a requesting client). An initial or first update may be a copy of the resource itself. The update server 122 may either apply updates subsequent to the initial update to the stored resource and/or may replace at least a portion of the stored resource with such updates. The update timestamp may be the time at which the update server 122 updated the stored resource. The timestamp may include a field for the day of the week, month, day, hour, minutes, seconds, and time zone. The seconds field may include sub-seconds (e.g., milliseconds). The timestamp of the update may be stored at the update server 122. As for the window, the update server 122 may determine the window based on the timestamp of the latest update to the resource. The window may be a one-second time range that begins and ends with the nearest whole seconds that precede and follow the timestamp. So, in the example, above, the window for a timestamp of 26.8 seconds may span from 26 to 27 seconds. The window for a timestamp of 15.3 seconds may span from 15 to 16 seconds. As will be discussed further below, this window may be used to determine whether the timestamp should be rounded up or down when the timestamp is reported to a client in a manner that requires whole numbers. The beginning and end times of the window may be referred to as the preceding and following window boundaries of the window, respectively.

In the example above, the window was one second, and was based on the nearest whole second that preceded the timestamp and on the nearest whole second that followed the timestamp. In other embodiments, the window may be defined differently, which may be useful to address server clock drift among multiple distributed update servers. For example, while one or more illustrative examples discussed herein include only a single server (e.g., the update server 122) involving only one clock, in some embodiments, there may be more than one server (e.g., a cluster of distributed servers). In such embodiments, there may be multiple clocks that may slightly differ from one another due to clock drift. For example, a clock of a first server may read 1.9 seconds while simultaneously another clock of a second server may read 2.1 seconds thereby resulting in a clock drift of 0.2 seconds. In such embodiments, the first server may determine that an update to a resource occurred at 1.9 seconds while the second server may determine that the update to the resource occurred at 2.1 seconds, which results in different timestamps for a Last-Modified header. Due to load balancing, a client request that was initially routed to the first server to service a first request may be routed to the second server to service the second request. As a result, the second server may use a different actual update time than that of the first server. In order to obviate different outcomes (e.g., a 200 Response versus a 304 Response) as a result of the clock drift, the window may be expanded to account for the clock drift. In some embodiments, the window may be any 1-second interval since this is the maximum granularity of the Last-Modified header. For example, in one embodiment, the window may be 2 seconds long, beginning and ending at the nearest whole 2-second time preceding and following the timestamp. In some embodiments where the Last-Modified header and the If-Modified-Since header may account for sub-seconds, the window may be set to span any duration of time, such as, for example, 0.5 seconds, 1.3679 seconds, etc. In an instance where the window is set to be 0.5 seconds long, the window may begin and end at the nearest half-second increment preceding and following the timestamp. Other alternative windows may be defined as well. In some embodiments, clock drift may be avoided by having at least one server share its update time with the other servers so that the other servers may use the shared update time as their update time when processing requests. Once the update time and window are determined, the method may proceed to step 315.

In step 315, the update server 122 may determine whether the update server 122 has received a read request (e.g., a request to retrieve the latest version of the resource) or a validation request (e.g., a request that simply asks the update server 122 to confirm that the client possesses the latest version). In response to a determination that the update server 122 has not received a read or validation request, the method may return to step 305. However, if the update server 122 has received a request, the update server 122 may determine whether a received request is a read request or a validation request. In response to a determination that the update server 122 has received a read request (e.g., a get request or other unconditional request), the method may proceed to step 320. In response to a determination that the update server 122 has received a validation request (e.g., a conditional request that request the update server 122 to only send a new copy of the resource if the client device's cached copy is out-of-date), the method may proceed to step 335.

The validation request may include an If-Modified-Since header. The If-Modified-Since header may include a timestamp of the resource cached at the client device, which the update server 122 may use to determine whether the client device's cached copy is up-to-date or out-of-date. As discussed above, this timestamp may have been received by the client device in response to a previous request associated with the resource. For example, this timestamp may be the timestamp received in a Last-Modified header of a 200 Response. The client device is sending the validation request to determine whether the copy of the resource the client device has cached is up-to-date.

In step 320, the update server 122 may determine whether the read request has been received within the window defined by the latest update of the resource in step 310. For example, the update server 122 may determine the time at which the read request was received by the update server 122. This time may be referred to herein as a read receipt time. If the read receipt time is within the window, then the method may proceed to step 325. For example, if the read receipt time is 2.9 seconds and the window is from 2 to 3 seconds, then the update server 122 may determine that the read receipt time is within the window. If the read receipt time is not within the window, then the method may proceed to step 330. For example, if the read receipt time is 3.1 seconds and the window is from 2 to 3 seconds, then the update server 122 may determine that the read receipt time is not within the window.

Additionally or alternatively, in some embodiments, the update server 122 may determine whether the read request is within the window based on whether the ceiling of the timestamp of the latest update of the resource (e.g., the rounded up timestamp of the latest update of the resource for a one-second window size) is greater than or equal to the ceiling of the read receipt time (e.g., the rounded up read receipt time), which is the time the read request was received by the update server 122. In response to a determination that the rounded up timestamp of the latest update is greater than or equal to the rounded up read receipt time, the method may proceed to step 325. In response to a determination that the rounded up timestamp of the latest update is not greater than or equal to the rounded up read receipt time, the method may proceed to step 330. In such embodiments, the update server 122 may determine the rounded up timestamp of the latest update of the resource by rounding up the timestamp to the nearest whole second (e.g., the nearest following window boundary not less than the timestamp of the latest update). Additionally, the update server 122 may determine the rounded up read receipt time by rounding up the read receipt time to the nearest whole second (e.g., the nearest following window boundary not less than the read receipt time). As used herein, the terms ceiling and floor may refer to mathematical functions. For instance, the ceiling of x may refer to the nearest following window boundary not less than x. For instance, the floor of x may refer to the nearest preceding window boundary not greater than x. X may refer to any time measurement or value discussed herein.

In step 325, the update server 122 may send, to the client device, the resource with a floor of the timestamp (e.g., a rounded down timestamp for a one-second window size) of the latest update of the resource. For example, the update server 122 may determine the floor of the timestamp of the latest update so that at least the seconds field corresponds to the lower bound of the window. For example, if the seconds field of the timestamp is 2.8 seconds, then the seconds field may be rounded down to 2 seconds to produce the rounded down timestamp. For example, if the timestamp is Thursday, January 8, 16:04:02.8 EST, the rounded down timestamp may be Thursday, January 8, 16:04:02 EST. The update server 122 may then send, to the requesting client device, the resource and the rounded down timestamp. For example, the update server 122 may send a 200 Response, in accordance with an HTTP specification, with the Last-Modified header including the rounded down timestamp. In some embodiments, the update server 122 may obtain the rounded down timestamp by determining the floor of the timestamp of the latest update of the resource.

In step 330, the update server 122 may, in response to determining that the read request was not received within the window, send, to the client device, the resource with a rounded up update timestamp of resource. For example, the update server 122 may determine the ceiling of the timestamp of the latest update so that at least the seconds field of the timestamp corresponds to the upper bound of the window. For example, if the seconds field of the timestamp is 3.4 seconds, then the seconds field may be rounded up to 4 seconds to produce the rounded up timestamp. For example, if the timestamp is Thursday, January 8, 16:04:02.8 EST, the rounded up timestamp may be Thursday, January 8, 16:04:03 EST. The update server 122 may then send, to the requesting client device, the resource and the rounded up timestamp. For example, the update server 122 may send a 200 Response, in accordance with an HTTP specification, with the Last-Modified header including the rounded up timestamp. In some embodiments, the update server 122 may obtain the rounded up timestamp by determining the ceiling of the timestamp of the latest update of the resource.

In step 335, the update server 122 may, in response to receiving a validation request from the client device, determine whether the validation request was received within the window defined by the latest update of the resource in step 310. For example, the update server 122 may determine the time at which the validation request was received by the update server 122. This time may be referred to herein as a validation receipt time. If the validation receipt time is within the window, then the method may proceed to step 325 as discussed above. For example, if the validation receipt time is 2.9 seconds and the window is from 2 to 3 seconds, then the update server 122 may determine that the validation receipt time is within the window. If the validation receipt time is not within the window, then the method may proceed to step 340. For example, if the validation receipt time is 3.1 seconds and the window is from 2 to 3 seconds, then the update server 122 may determine that the validation receipt time is not within the window.

In the above discussion, the system may determine whether the receipt time of 2.9 seconds is between 2 and 3 seconds. This may be done by a simple number comparison, but in some embodiments, this may be done by comparing rounded versions of the receipt time of 2.9 seconds. For example, the "floor" for 2.9 seconds is 2 seconds (2.9 rounded down), and the "ceiling" for 2.9 seconds is 3 seconds (2.9 rounded up). This alternative comparison can simply determine the floor or ceiling of the receipt time, and compare that to the beginning or end of the window (e.g., determining whether the 2 second floor is equal to the 2 second beginning of the window, or whether the 3 second ceiling is equal to the 3 second ending of the window). In such an embodiment, the update server 122 may determine whether the validation request was received within the window based on whether the ceiling of the timestamp of the latest update (e.g., the rounded up timestamp of the latest update for a one-second window size) is greater than or equal to the ceiling of the validation receipt time (e.g., the rounded up validation receipt time), which is the time the validation request was received by the update server 122. In response to a determination that the rounded up timestamp of the latest update is greater than or equal to the rounded up validation receipt time, the method may proceed to step 325. In response to a determination that the rounded up timestamp of the latest update is not greater than or equal to the rounded up validation receipt time, the method may proceed to step 340. In such embodiments, the update server 122 may determine the rounded up timestamp of the latest update of the resource by rounding up the timestamp to the nearest whole second (e.g., the nearest following window boundary not less than the timestamp of the latest update) and may determine the rounded up validation receipt time by rounding up the actual validation receipt time to the nearest whole second (e.g., the nearest following window boundary not less than the validation receipt time).

In step 340, the update server 122 may, in response to determining that the validation request is not within the window, determine whether a timestamp included in the received validation request is less than or equal to a timestamp of the latest update to the resource. The timestamp included in the validation request may be associated with a copy of the resource cached at the client device and may be referred to herein as the validation's timestamp. The validation's timestamp may be a value included in an If-Modified-Since header of the validation request. In response to a determination that the validation's timestamp is less than or equal to the timestamp of the latest update of the resource, the method may proceed to step 330 as discussed above. In response to a determination that the validation's timestamp is not less than or equal to the timestamp of the latest update to the resource, the method may proceed to step 345.

Additionally or alternatively, in some embodiments, the update server 122 may determine whether an If-Modified-Since header value (e.g., a timestamp included in the validation request) is equivalent to the ceiling of the timestamp (e.g., the rounded up timestamp) of the latest update of the resource. In response to a determination that the If-Modified-Since header value is not equivalent to the rounded up timestamp of the latest update of the resource, the method may proceed to step 330. In response to a determination that the If-Modified-Since header value is equivalent to the rounded up timestamp of the latest update of the resource, the method may proceed to step 345.

In step 345, the update server 122 may send a resource-not-modified response to the client device. For example, the resource-not-modified response may indicate to the client device that the copy of the resource cached at the client device is up-to-date. For example, the resource-not-modified response may indicate that the client device has the latest update of the resource. For example, the update server 122 may send a 304 Response in accordance with an HTTP specification. The update server 122 might not send the resource to the client device. If the update server 122 determines to include a Last-Modified header within the 304 Response (which HTTP specifications permit and encourage but might not require), the update server 122 may use the rounded up timestamp for the Last-Modified header.

While the above was illustrated with respect to one update of the resource and one request for the resource, the method of FIG. 3 (e.g., steps 305-345) may be repeated for subsequent updates to the resource and/or subsequent requests associated with the resource (e.g., a read request, validation request, etc.).

Figure 4:
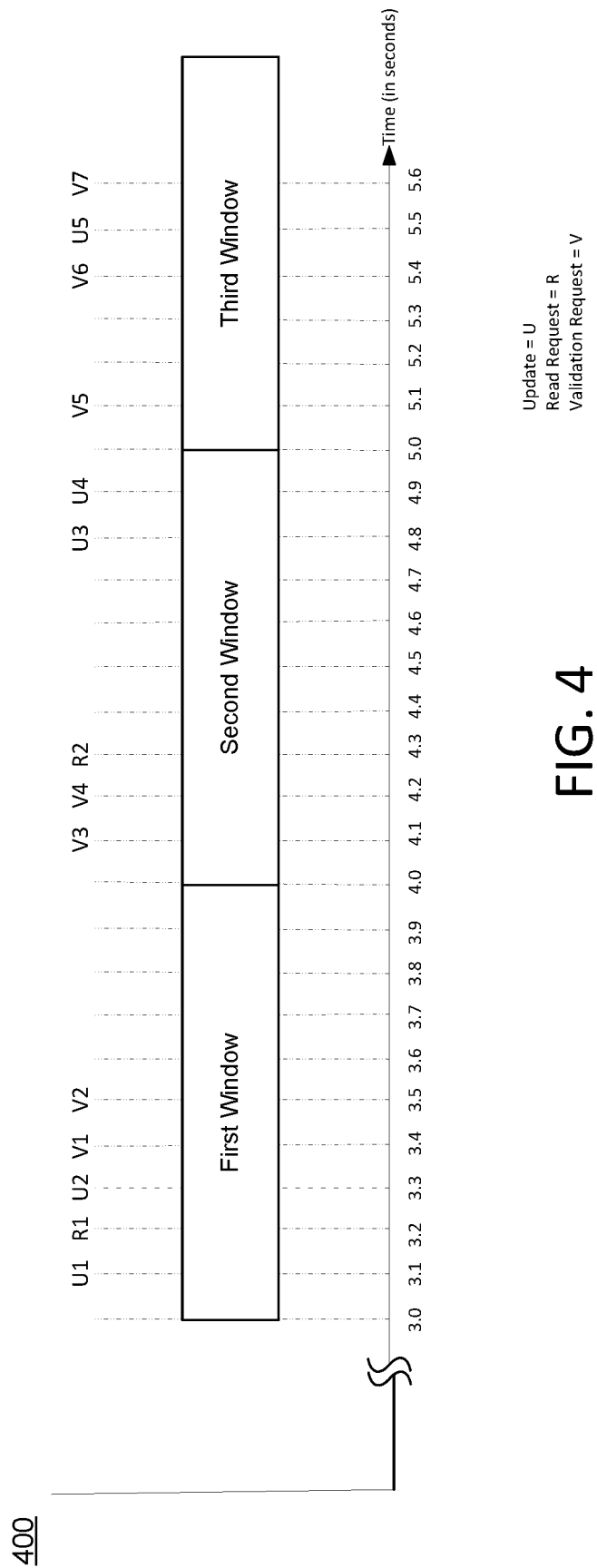
FIG. 4 depicts an example of a timeline for various updates to a resource and various requests associated with the resource in accordance with one or more example aspects discussed herein.

FIG. 4 depicts an example of a timeline for various updates to a resource and various requests associated with the resource in accordance with one or more example aspects discussed herein. The time may be based on a local time of the update server 122. Alternatively, the time may be based on a time of a device remote from the update server 122.

At time 3.1 seconds, a first update U1 may be received by the update server 122 (see step 305). The first update U1 may be the initial copy of the resource. The update server 122 may store the resource and determine the timestamp and window (see step 310). The seconds field of the timestamp may be 3.1 seconds. The first window may begin at 3 seconds and end at 4 seconds.

At time 3.2 seconds, the update server 122 may receive a first read request R1 from a client device (see step 315). The update server 122 may determine that the first read request R1 was received within the first window (see step 320). For example, the time 3.2 seconds is between the 3 seconds and 4 seconds window boundaries. In response, the update server 122 may respond to the first read request R1 by sending, to the client device, the requested resource with the rounded down timestamp (e.g., 3 seconds) of the latest update of the resource (see step 325). The timestamp may be sent as a value of a Last-Modified header of a 200 Response.

At time 3.3 seconds, the update server 122 may receive a second update U2 of the resource (see step 305). The update server 122 may update the resource and may determine the update timestamp and window for the latest update (see step 310). The timestamp may be 3.3 seconds and, thus, the window may begin at 3 seconds and end at 4 seconds (e.g., the first window).

At time 3.4 seconds, the update server 122 may receive a first validation request V1 from the client device (see step 315). The update server 122 may determine that the first validation request V1 was received within the first window (see step 335). For example, the time 3.4 seconds is between the 3 seconds and 4 seconds window boundaries of the first window. In response, the update server 122 may respond to the first validation request V1 by sending, to the client device, the requested resource with the rounded down timestamp (e.g., 3 seconds) of the latest (e.g., second) update of the resource (see step 325). The timestamp may be sent as a value of a Last-Modified header of a 200 Response.

At time 3.5 seconds, the update server 122 may receive a second validation request V2 from the client device (see step 315). The update server 122 may determine that the second validation request V2 was received within the first window (see step 335). For example, the time 3.5 seconds is between the 3 seconds and 4 seconds window boundaries of the first window. In response, the update server 122 may respond to the second validation request V2 by sending, to the client device, the requested resource with the rounded down timestamp (e.g., 3 seconds) of the latest (e.g., second) update of the resource (see step 325). The timestamp may be sent as a value of a Last-Modified header of a 200 Response.

At time 4.1 seconds, the update server 122 may receive a third validation request V3 from the client device (see step 315). The update server 122 may determine that the third validation request V3 was not received within the first window (see step 335). For example, the time 4.1 seconds is not between the 3 seconds and 4 seconds window boundaries of the first window. In response, the update server 122 may determine whether a timestamp associated with the resource and included in the validation request (e.g., the validation's timestamp) is less than or equal to the timestamp of the latest update of the resource stored at the update server 122 (see step 340). The validation's timestamp may be a value of an If-Modified-Since header of the validation request. The validation's timestamp may be associated with a cached copy of the resource stored at the client device. For example, the timestamp included in the validation request is the timestamp provided (e.g., in a Last-Modified header) by the update server 122 in response to a previous read or validation request. In this example, the timestamp included in the validation request (e.g., 3 seconds) is less than the timestamp of the latest update (e.g., 3.3 seconds). As a result, the update server 122 may send, in response to the third validation request V3, the updated resource with a rounded up timestamp (e.g., 4 seconds) of the latest (e.g., second) update of the resource (see step 330). The timestamp may be sent as a value of a Last-Modified header of a 200 Response.

At time 4.2 seconds, the update server 122 may receive a fourth validation request V4 from the client device (see step 315). The update server 122 may determine that the fourth validation request V4 was not received within the first window (see step 335). For example, the time 4.2 seconds is not between the 3 seconds and 4 seconds window boundaries of the first window. In response, the update server 122 may determine whether a timestamp associated with the resource and included in the fourth validation request V4 is less than or equal to the timestamp of the latest update (see step 340). In this example, the timestamp included in the fourth validation request (e.g., 4 seconds) is not less than or equal to the timestamp of the latest update of the resource (e.g., 3.3 seconds). As a result, the update server 122 may send, in response to the fourth validation request V4, a resource-not-modified response (e.g., a 304 Response) to the client device. The resource-not-modified response may indicate to the client device that the current copy of the resource the client device has stored in its cache is up-to-date.

At time 4.3 seconds, the update server 122 may receive a second read request R2 from the client device (see step 315). The update server 122 may determine that the second read request R2 was not received within the window (e.g., the first window) defined by the latest update time (see step 320). For example, the time 4.3 seconds is not between 3 seconds and 4 seconds. In response, the update server 122 may send, to the client device, the updated resource with the rounded up timestamp (e.g., 4 seconds) of the latest update of the resource (see step 330).

At time 4.8 seconds, the update server 122 may receive a third update U3 of the resource (see step 305). The update server 122 may update the resource and may determine the update timestamp and window for the latest update (see step 310). The timestamp may be 4.8 seconds and, thus, the window may begin at 4 seconds and end at 5 seconds (e.g., the second window).

At time 4.9 seconds, the update server 122 may receive a fourth update U4 of the resource (see step 305). The update server 122 may update the resource and may determine the update timestamp and window for the latest update (see step 310). The timestamp may be 4.9 seconds and, thus, the window may begin at 4 seconds and end at 5 seconds (e.g., the second window).

At time 5.1 seconds, the update server 122 may receive a fifth validation request V5 from the client device (see step 315). The update server 122 may determine that the fifth validation request V5 was not received within the second window (see step 335). For example, time 5.1 seconds is not between 4 seconds and 5 seconds. The seconds field of the timestamp included in the fifth validation request V5 may be time 4 seconds (from the response to the second read request R2). The update server 122 may determine that time 4 seconds is less than time 4.9 (see step 340). In response, the update server 122 may send, to the client device, the updated resource with the rounded up timestamp (e.g., time 5 seconds) of the latest update U4 of the resource.

At time 5.4 seconds, the update server 122 may receive a sixth validation request V6 from the client device (see step 315). The update server 122 may determine that the sixth validation request V6 was not received within the second window (see step 335). For example, time 5.4 seconds is not between 4 seconds and 5 seconds. The seconds field of the timestamp included in the sixth validation request V6 may be time 5 seconds (the last received timestamp received by the client device from the update server 122). The update server 122 may determine that time 5 seconds is not less than time 4.9 (see step 340). In response, the update server 122 may send, to the client device, the resource-not-modified response.

At time 5.5 seconds, the update server 122 may receive a fifth update U5 of the resource (see step 305). The update server 122 may update the resource and may determine the update timestamp and window for the latest update (see step 310). The timestamp may be 5.5 seconds and, thus, the window may begin at 5 seconds and end at time 6 seconds (e.g., the third window).

At time 5.6 seconds, the update server 122 may receive a seventh validation request from the client device (see step 315). The update server 122 may determine that the seventh validation request V7 was received within the second window (see step 335). For example, time 5.6 seconds is between 5 seconds and 6 seconds. In response, the update server 122 may send, to the client device, the updated resource and the rounded down timestamp (e.g., time 5 seconds) of the latest update.

As is apparent from the foregoing examples, any time a request is within a window, the update server 122 sends, to the client device, the latest updated resource and the rounded down timestamp of the latest update of the resource. The first time the update server 122 receives a validation request that is not within the window, the update server 122 sends, to the client device, the latest updated resource and the rounded up timestamp of the latest update of the resource. The next time the update server 122 receives a validation request that is not within the window, the update server 122 may send, to the client device, a resource-not-modified response. The process may then repeat for a second window. By rounding down in some instances and round up in other instances, the update server 122 is able to avoid a stuck update problem for client devices that operate in accordance with HTTP 1.0 specification. For example, the client device will receive updates from the server even if the updates occurred within the same second.

In one or more embodiments, the window discussed herein may be defined to address server clock drift even if the servers agree on the update date time since the servers may disagree on a request's receipt time as a result of the server clock drift. As an example, two servers may agree that the latest update time of a resource may be 1.8 seconds and that the window size may be one second. While a read or validation request may be received at each server at the same time, the first server may determine that the request was received at 1.9 seconds while the second server may determine that the request was received at 2.1 seconds due to a clock drift of 0.2 seconds. As a result, the first server may determine that the request's receipt time of 1.9 seconds is within the window (see steps 320, 335) while the second server may determine that the request's receipt time of 2.1 seconds is outside of the window. If another update occurs at the first server at 1.95 seconds, a client device that sent a read or validation request to the second server and then sends a subsequent validation request to the first server may miss the update that occurred at the first server at 1.95 seconds. However, if the one second window is extended to account for the clock drift (e.g., by 0.2 seconds), the client that sends the subsequent validation request might not miss the update that occurred on the first server at 1.95 seconds.

As described above, various aspects of the disclosure relate to providing a scheme for managing Last-Modified information. In other embodiments, however, the concepts discussed herein can be implemented in any other type of computing device (e.g., a desktop computer, a server, a console, a set-top box, etc.). Thus, although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method comprising:
   receiving, by a computing device, a plurality of requests associated with a resource;
   determining, based on the plurality of requests, a first update time for a particular version of a resource and a second update time, for the particular version of the resource, that is different from the first update time;
   sending, as a response to a first request of the plurality of requests, the particular version of the resource with an indication that the particular version was last updated at the first update time; and
   sending, as a response to a second request of the plurality of requests, the particular version with an indication that the particular version was last updated at the second update time.

2. The method of claim 1, further comprising:
   determining, by the computing device and based on a receipt time of the first request preceding or equaling the second update time, to include, in the response to the first request, the indication that the particular version was last updated at the first update time.

3. The method of claim 1, further comprising:
   determining, by the computing device and based on a receipt time of the second request being after the second update time, to include, in the response to the second request, the indication that the particular version was last updated at the second update time.

4. The method of claim 1, further comprising:
   comparing, based on a determination that the second request is a validation request, the second update time with a timestamp included in the validation request.

5. The method of claim 1, further comprising:
   determining, based on a determination that the second update time is not equal to a timestamp included in a validation request, to send the indication that the particular version was last updated at the second update time.

6. The method of claim 1, further comprising sending, as a response to a third request of the plurality of requests, an indication that the resource is up to date.

7. The method of claim 1, further comprising:
   determining, by the computing device, a first update time of the particular version of the resource;
   determining, based on the first update time of the particular version of the resource, the second update time, wherein the second update time is an approximate update time that is after the first update time;
   receiving, by the computing device and from a client device, the second request, wherein the second request comprises a timestamp associated with a particular version of the resource at the client device; and
   determining, based on whether the second request was received after the approximate update time, whether to use the timestamp in generating the response to the second request.

8. A method comprising:
   receiving, by a first computing device and from a second computing device, a first request for a resource;
   determining, based on an update time of a particular version of the resource and based on a receipt time of the first request, to send a first approximate update time that is before the update time;
   sending, to the second computing device, the first approximate update time and the particular version of the resource;
   receiving, from the second computing device, a second request for the resource;
   determining, by the first computing device and based on the update time of the particular version of the resource and based on a receipt time of the second request, to send a second approximate update time that is after the update time; and
   sending, to the second computing device, the second approximate update time and the particular version of the resource.

9. The method of claim 8, further comprising determining that the first request is a read request,
   wherein the determining to send the first approximate update time is based on a determination that the first request is received before the second approximate update time.

10. The method of claim 8, further comprising determining that the second request is a read request,
    wherein the determining to send the second approximate update time is based on a determination that the second request is received after the second approximate update time.

11. The method of claim 8, further comprising:
    receiving, from the second computing device and after sending the first approximate update time and the particular version of the resource, a validation request for the resource;
    determining, based on receipt of the validation request before the second approximate update time, to send the first approximate update time; and
    re-sending, to the second computing device, the first approximate update time and the particular version of the resource.

12. The method of claim 8, further comprising:
    receiving, from the second computing device and after sending the first approximate update time and the particular version of the resource, a validation request for the resource;
    comparing, based on receipt of the validation request after the second approximate update time, a time from a header of the validation request with the second approximate update time; and
    sending, to the second computing device and based on the comparing, the second approximate update time and the particular version of the resource.

13. The method of claim 8, further comprising:
receiving, from the second computing device and after sending the second approximate update time and the particular version of the resource, a validation request for the resource;
comparing, based on receipt of the validation request after the second approximate update time, a time from a header of the validation request with the second approximate update time; and
sending, to the second computing device and based on the comparing, a response indicating that the resource is up to date.

14. The method of claim 8, further comprising:
determining an update time, of a subsequent version of the resource, that is after the second approximate update time;
receiving, after the update time of the subsequent version, a third request for the resource; and
determining, based on whether a receipt time of the third request is after a third approximate update time, whether to send the second approximate update time or the third approximate update time, wherein the third approximate update time is after the update time of the subsequent version.

15. The method of claim 8, further comprising:
sharing the update time with one or more servers associated with the first computing device.

16. A method comprising:
determining, by a computing device, an update time of a particular version of a resource;
determining, based on the update time of the particular version of the resource, an approximate update time that is after the update time;
receiving, by the computing device and from a client device, a request associated with the resource, wherein the request comprises a timestamp associated with a particular version of the resource at the client device;
based on receiving the request after the approximate update time, use the timestamp in generating a response to the request; and
sending, to the client device, the response to the request.

17. The method of claim 16, wherein the request associated with the resource is a validation request.

18. The method of claim 16, using the timestamp in generating a response to the request comprises:
comparing, based on receiving a validation request after the approximate update time, the timestamp with the approximate update time.

19. The method of claim 16, further comprising:
determining, based on comparing the timestamp with the approximate update time, whether to send the approximate update time in the response to the request.

20. The method of claim 16, wherein the sending the response to the request comprises:
sending, based on a determination that the timestamp equals the approximate update time, the response indicating that the resource is up to date.

21. The method of claim 16, wherein the sending the response to the request comprises:
sending, based on a determination that the timestamp is not equal to the approximate update time, the approximate update time and the particular version of the resource.

22. The method of claim 16, further comprising:
receiving, by the computing device and from a second client device, a second request associated with the resource;
determining, based on the second request, a second approximate update time that is before the update time; and
sending, as a response to the second request, the particular version with an indication that the particular version was last updated at the second approximate update time.

23. The method of claim 8, further comprising:
sending a particular version of a content item to different devices and with different indications of when the particular version of a content item was last updated.

24. The method of claim 8, further comprising:
determining a plurality of last updated times for a particular version of a content item.

* * * * *